United States Patent [19]

Kurihara

[11] Patent Number: 4,960,192
[45] Date of Patent: Oct. 2, 1990

[54] HUB CLUTCH

[75] Inventor: Sakuo Kurihara, Tochigi, Japan

[73] Assignee: Tochigifujisangyo Kabushiki Kaisha, Japan

[21] Appl. No.: 293,056

[22] Filed: Jan. 3, 1989

[30] Foreign Application Priority Data

Jan. 11, 1988 [JP] Japan .................................. 63-2424
Jan. 21, 1988 [JP] Japan .................................. 63-9678

[51] Int. Cl.⁵ ...................... F16D 25/061; B60K 23/08
[52] U.S. Cl. .................................. 192/67 R; 192/85 V; 192/114 R; 180/247; 403/1
[58] Field of Search ............. 192/49, 50, 67 R, 85 A, 192/85 V, 88 A, 114 R; 180/247; 403/1

[56] References Cited

U.S. PATENT DOCUMENTS

| | | | |
|---|---|---|---|
| 2,948,557 | 8/1960 | Howe et al. | 192/67 R X |
| 3,351,364 | 11/1967 | Warn et al. | 403/1 |
| 4,213,514 | 7/1980 | Ehrlinger et al. | 180/247 X |
| 4,282,949 | 8/1981 | Kopich et al. | 192/67 R X |
| 4,293,061 | 10/1981 | Brown | 192/67 R |
| 4,625,846 | 12/1986 | Gomez | 192/67 R |
| 4,627,512 | 12/1986 | Clohessy | 180/247 |
| 4,817,752 | 4/1989 | Lobo et al. | 180/247 |

FOREIGN PATENT DOCUMENTS 61-238516 10/1986 Japan .

Primary Examiner—Richard Lorence
Attorney, Agent, or Firm—Samuels, Gauthier & Stevens

[57] ABSTRACT

To prevent dust or muddy water from entering a hub housing or to prevent a hub clutch from being allowed to be inoperative, a hub clutch for selectively coupling or decoupling a wheel shaft to or from a clutch housing (to which a wheel is fixed), the hub clutch comprises a drive gear fixed to the wheel drive shaft; a slide gear axially slidably coupled to the clutch housing; a diaphragm fixed to the slide gear so as to partition an inner space of the clutch housing into an inner enclosed chamber and an outer enclosed chamber; and a control valve connected to an engine intake manifold vacuum, for selectively applying vacuum into the inner chamber and atmospheric pressure into the outer chamber or vice versa to move the diaphragm. Further, a piston plate and a spring can be used instead of the diaphragm.

4 Claims, 4 Drawing Sheets

FREE (2WD)

LOCKED (4WD)

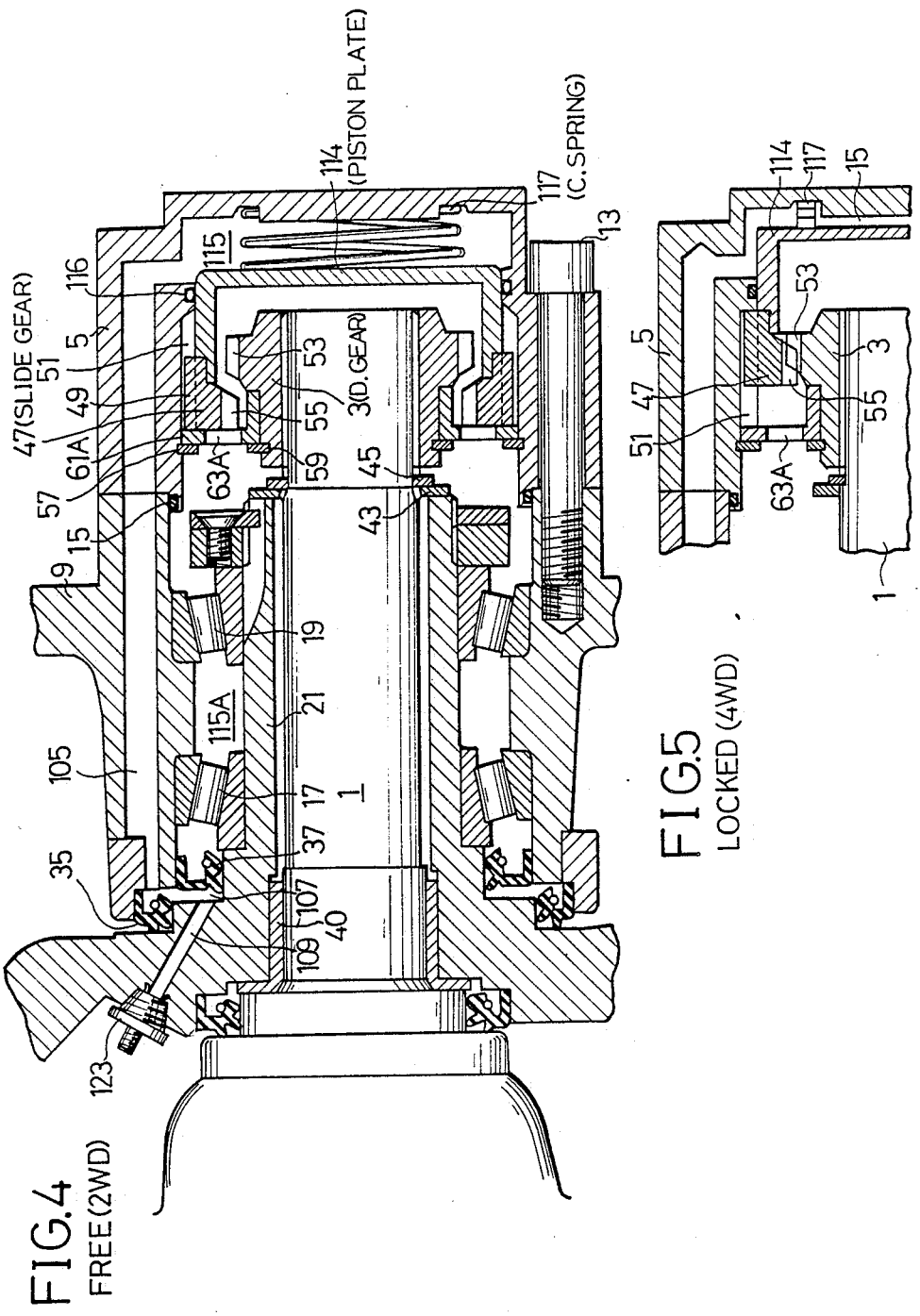

HUB CLUTCH

BACKGROUND OF THE INVENTION

1. Field of the Invention

The present invention relates generally to a hub clutch suitable for use in part-time four-wheel drive vehicles (referred to as part-time 4WD vehicles, hereinafter), and more specifically to a hub clutch low in noise, low in 2WD fuel consumption rate, long in life, and stable in function by protecting the hub clutch from external foreign matters.

2. Description of the Prior Art

In a part-time four wheel drive vehicle, for instance, when the vehicle travels in two wheel drive (referred to as 2WD) mode, the power transmission system including a driven-side propeller shaft, a differential gear, a vehicle wheel shaft, etc. are driven by a rotational power supplied from driven-side vehicle wheels. In order to reduce noise, lower fuel consumption rate, and prolong power transmission parts life, etc., a hub clutch is usually used to decouple the driven side vehicle wheels from the power transmission system.

An example thereof is disclosed in Japanese Unexamined Published (Kokai) Patent Application No. 61-238516 as shown in FIG. 1, in which the hub clutch actuating (coupling and/or decoupling) means is operated by pressure.

In this prior-art hub clutch, a drive gear 201 fixed to a wheel shaft 203 is engaged (coupled) with or disengaged (decoupled) from a slide gear 207 slidably moved relative to a wheel hub side housing 205 via a diaphragm 215 moved by a vacuum or an atmospheric pressure.

In more detail, the housing 205 is rotatably supported by a spindle 213 via a pair of bearings 209 and 211. The flexible diaphragm 215 separates the housing 205 into two right and left side chambers. A plate 217 movable together with the diaphragm 215 in the right and left (axial) directions engages or disengages the slide gear 207 with or from the drive gear 201. An airtight chamber 219 formed on the left side of the diaphragm 215 in FIG. 1 is connected to an engine intake manifold via a passage 221 which is switched to vacuum pressure or atmospheric pressure through a control valve 223 disposed midway of the passage 221. When the airtight chamber 219 is kept under vacuum condition, the diaphragm 215 is moved in the leftward direction, so that the plate 217 moves the slide gear 207 in the leftward direction against the biasing force of a coil spring 225 to engage the slide gear 207 with the drive gear 201; that is, the housing 205 is coupled with the wheel shaft 203 to realize a 4WD mode.

On the other hand, when the airtight chamber 219 is kept under atmospheric pressure, since the slide gear 207 is moved by the biasing force of the coil spring 225 in the rightward direction to disengage the slide gear 207 from the drive gear 201; that is, the housing 205 is decoupled from the wheel shaft 203 to realize a 2WD mode to reduce noise and economize power without rotating a propeller shaft.

Further, in FIG. 1, air ports 229 are formed in a right side partition chamber 227 (on the right side from the diaphragm 215) to keep the partition chamber 227 under atmospheric pressure.

In the above-mentioned prior-art hub clutch, however, when the wheel shaft 203 is coupled to the housing 205 during 4WD travel, since a high vacuum is always introduced into the airtight chamber 219, external contaminants such as dust and muddy water tend to enter the chamber 219 through each seal portion. Therefore, there exists a problem in that such contaminants move to the coupled portion (e.g. slide gear 201) or the sliding portion (e.g. bearings 209 and 211). Further, the movement of the diaphragm 215 is prevented by ice which has formed from water that has entered through the air ports 229 into the partition chamber 227 or by solidified mud. As described above, there exists a problem in that the clutch function and durability are deteriorated markedly.

Further, when the vacuum fluctuates during the 4WD travel and therefore the diaphragm actuation force is reduced below the biasing force of the coil spring 225, the slide gear 207 and the drive gear 201 are disengaged by the force of the coil spring 225, so that there exists another problem in that the hub clutch is returned to the 2WD mode.

SUMMARY OF THE INVENTION

With these problems in mind, therefore, it is the primary object of the present invention is to provide a hub clutch by which the slide gear can be reliably meshed with the drive gear while preventing external contaminants (dust, mud, water, etc.) from entering the clutch housing, thereby improving the durability of critical clutch components.

To achieve the above-mentioned object, a hub clutch, according to the present invention, for selectively coupling or decoupling a wheel drive shaft to or from a clutch housing formed with a hub portion to which a wheel is fixed, comprises: (a) a drive gear fixed to an outer circumferential portion of the wheel drive shaft; (b) a slide gear axially slidably coupled to an inner circumferenctial portion of the clutch housing; (c) movable means fixed to said slide gear so as to partition an inner space of the clutch housing into an inner enclosed chamber and an outer enclosed chamber; and (d) pressure supplying means, coupled to the clutch housing, for selectively supplying a pressure difference between said inner and outer enclosed chambers to move said slide gear via said movable means to engage or disengage of said slide gear with or from said drive gear.

In the first embodiment of the present invention, the movable means comprises (a) a diaphragm fixed to an inner circumferential portion of the housing and (b) a movable member fixed between the slide gear and the diaphragm. Further, the pressure supplying means comprises (a) an engine intake manifold; and (b) a control valve for selectively applying an intake manifold vacuum into the inner chamber and atmospheric pressure into the outer chamber or vice versa to move the movable means. In the second embodiment of the present invention, the movable means comprises: (a) a cylindrical piston plate slidably fitted to an inner circumferential portion of the housing; and (b) a spring for urging the cylindrical piston plate into engagement of the slide gear from the drive gear. The pressure supplying means comprises; (a) an engine intake manifold; and (b) a control valve for applying a vacuum into the outer enclosed chamber of the clutch housing to move the cylindrical piston plate into engagement of the slide gear with the drive gear.

As described above, in the hub clutch according to the present invention, since external contaminants are excluded from the hub clutch housing, it is possible to increase the durability of component parts and to decrease the fuel consumption rate and noise during 2WD travel in a part time 4WD vehicle.

BRIEF DESCRIPTION OF THE DRAWINGS

The features and advantages of the hub clutch according to the present invention over the prior-art will be more clearly appreciated from the following description taken in conjunction with the accompanying drawings in which:

FIG. 4 is a cross-sectional view showing a second embodiment of a hub clutch according to the present invention, in which free conditions (2WD) are shown; and FIG. 5 is an enlarged cross-sectional view showing only the slide gear and the drive gear, in which locked conditions (4WD) are shown.

DETAILED DESCRIPTION OF THE PREFERRED EMBODIMENTS

A first embodiment of the hub clutch according to the present invention will first be described with reference to FIGS. 2 and 3.

Figure 2:
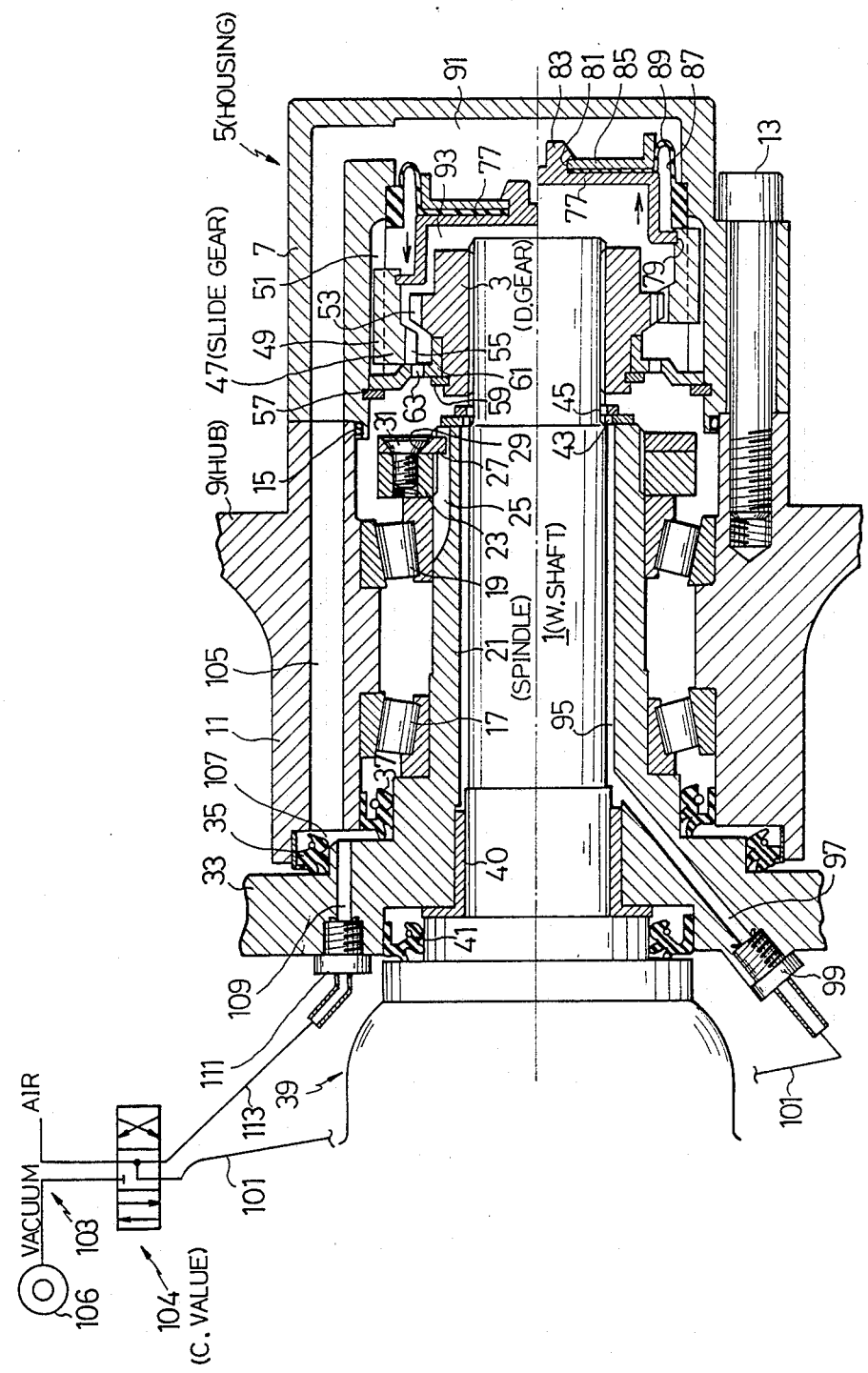
FIG. 2 is a similar cross-sectional view showing a first embodiment of a hub clutch according to the present invention, in which decoupled (free) conditions (2WD) are shown on the upper side and coupled (locked) conditions (4WD) are shown on the lower side.

The hub clutch shown in FIGS. 2 is attached to a driven-side wheel shaft as when switched to 2WD mode, for instance such as a front wheel shaft of a front engine rear drive base (FR base) 4WD vehicle.

In FIG. 2, the hub clutch comprises a front wheel drive shaft 1 fixed to a constant velocity joint 39, a drive gear 3 spline engaged with the wheel shaft 1, and a slide gear 47 slidably spline engaged with a housing 5 formed with a wheel hub portion 9 for fixing a vehicle wheel (not shown). This slide gear 47 is moved in the rightward and leftward directions by a diaphragm 87 actuated by vacuum or atmospheric pressure applied to an inner enclosed chamber 93, or an outer enclosed chamber 91 of the housing 5, both of which are partitioned by the diaphragm 87.

The housing 5 is arranged so as to enclose the wheel shaft 1 and the drive gear 3. The housing 5 is formed with an enclosed cylindrical portion 7 and a base portion 11 with a hub portion 9. The base portion 11 is fixed to the cylindrical portion 7 with bolts 13 via an 0-ring 15. A wheel (not shown) is attached to the hub portion 9. Further, the housing 5 is rotatably supported by a vehicle body spindle 21 (fixed to a vehicle body) via a pair of bearings 17 and 19.

A lock nut 23 (FIG. 2) is attached to a top end portion of the spindle 21 to fix the bearing 19. Under the condition that a pawl 27 is engaged with a spline 25 formed at an end portion of the spindle 21, a rotation lock member 29 is fixed to a lock nut 23 with screws 31. Further, two seal members 35 and 37 are provided between the spindle base portion 33 and the base portion 11 of the housing 5.

The wheel shaft 1 is fixed to a constant velocity joint 39, and rotatably supported by the spindle 21 via a bush bearing 40 disposed between the joint 39 and the spindle base portion 33. A seal member 41 is disposed between the wheel shaft 1 and the spindle base 33. Further, a stopper ring 43 formed with holes and slidably fitted into contact with an end of the spindle 21 and a retainer 45 formed with holes to hold a stopper ring 43 are attached to the wheel shaft 1 to restrict the leftward motion of the spindle 21 relative to the wheel shaft 1.

The slide gear 47 is a ring-shaped coupling member and slidably spline-engaged with an inner circumferential surface formed in the cylindrical portion of the housing 5 via splines 49 formed on an outer circumferential surface of the slide gear 47. Further, a gear portion 55 formed in an inner circumferential surface of the slide gear 47 is engageable with a gear portion 53 formed on the outer circumferential surface of the drive gear 3. As described above, the slide gear 47 slides along the spline grooves 51 formed in the housing 5 so as to be reciprocably movable between the coupling (locked) position (the lower half position in FIG. 2 and in FIG. 3B) at which the drive gear 3 is geared with the slide gear 47 of the housing 5 and the decoupled (free) position (the upper half position in FIG. 2 and in FIG. 3A) at which the drive gear 3 is not geared with the slide gear 47 of the housing 5.

Between the drive gear 3 and the cylindrical portion 7 of the housing 5, there is provided a centering member 61 whose inner and outer edge portions are slidably supported, respectively by two stopper rings 59 and 57, respectively to arrange the wheel shaft 1 (the drive gear 3) concentrically with the housing 5. This centering member 61 is formed with a plurality of openings 63 arranged in circular form through which air is passed when the hub clutch is being operated.

Figure 3A:
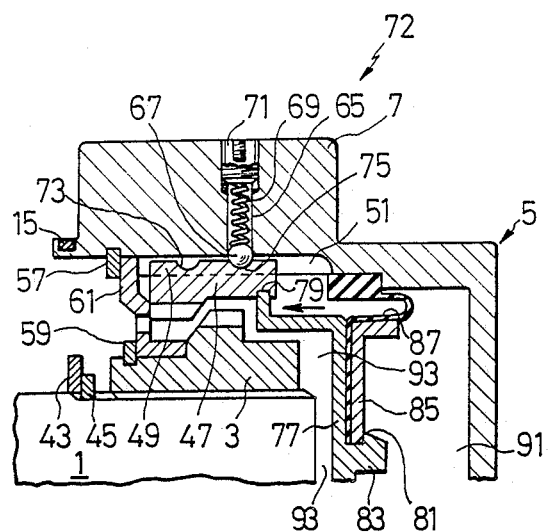
FIG. 3A is an enlarged cross-sectional view showing the slide gear including a detent mechanism under free conditions (2WD) of the hub clutch shown in FIG. 2.
Figure 3B:
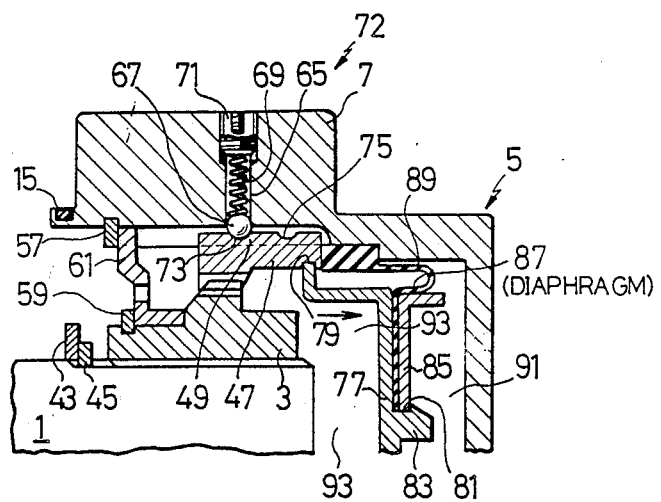
FIG. 3B is an enlarged cross-sectional view showing the slide gear including the detent mechanism under locked conditions (4WD) of the hub clutch shown in FIGS. 2.

With reference to FIGS. 3A and 3B, a check ball 67 and a check spring 69 for urging this check ball 67 toward the radially inside are attached from the inside of the housing 5 to a through hole 65 formed in the cylindrical wall of the cylindrical portion 7 of the housing 5, and a plug 71 for holding the check spring 69 is screwed from the outer circumference side thereof. Further, two recessed portions 73 and 75 are formed so as to hold the check ball 67 on the outer circumferential surface of the spline 49 of the slide gear 47. As shown in FIG. 3B, this recessed portion 73 is located so as to engage with the check ball 67 when the slide gear 47 is at the coupled (locked) position. On the other hand, as shown in FIG. 3A, the recessed portion 75 is located so as to engage with the check ball 67 when the slide gear 47 is at the decoupled (free) position. When the slide gear 47 is moved, since this check ball 67 is moved against the elastic force of the check spring 69, the check ball 67 is engaged with the recessed portions 73 or 75 to hold the slide gear 47 from the locked position to the free position or vice versa. As described above, a check mechanism 72 for the slide gear 47 is composed of the check ball 67, the check spring 69 and the plug 71.

With reference to FIGS. 3A and 3B, an enclosed movable member 77 is supported by a diaphragm 87 fixed the housing 5, and further the outer circumferential edge of the member 77 is fixed to a groove 79 formed in the slide gear 47, so that the slide gear 47 is movable along the spline grooves 51 formed in the housing 5 together with the enclosed movable member 77. In more detail, the enclosed movable member 77 includes a projection portion 83 formed with a groove 81 provided on the right side wall of the movable member 77, and a push plate 85 engaged with this groove 81. The diaphragm 87 is a flexible partition film, whose inner edge portion is airtightly sandwiched between the push plate 85 and the movable member 77. Further, the thick-wall portion formed at the outer edge portion of the diaphragm 87 is airtightly fixed to the inner circumferential surface of the cylindrical portion 7 of the housing 5. Further, the diaphragm 87 is formed with a bent or folded portion 89 as deformable surplus, so as to follow the movement of the movable member 77. As described above, the inside of the housing 5 is partitioned right and left by the movable member 77 and the diaphragm 87 to form a right side airtight chamber 91 and a left side airtight chamber 93.

With reference to FIG. 2 again, a gap 95 is provided between the wheel shaft 1 and the spindle 21 so as to communicate with the airtight chamber 93 (on the right side) through the openings 63 of the centering member 61 and other openings formed both in the stopper ring 43 and the retainer 45, the gap 95 communicate with an orifice 97 formed in the spindle base portion 33 on the left side. Further, this gap 95 is connected to an engine intake manifold 106 via a plug 99 provided at the output of the orifice 97, a passage 101, and a control valve 104, so that a pressure (vacuum) supply system path 103 can be formed between the engine intake manifold 106 and the airtight chamber 93 (on the leftside of the diaphragm 77).

At the cylindrical portion of the housing 5, an air passage 105 is provided so as to open to the airtight chamber 91 (on the right side of the diaphragm 77) and between the two seal members 35 and 37 on the left side. This air passage 105 also communicates with an orifice 109 formed in the spindle base portion 33 via a space 107 formed between the seal members 35 and 37, further with the control valve 104 via the plug 111 and the passage 113 provided on the outside of the orifice 109, and further with the engine intake manifold 106 via the same passage so as to provide a pressure supply system 103. As described above, a pressure (vacuum) supply system 103 can be disposed to connect the engine intake manifold 106 to the airtight chamber 91.

Therefore, when a pressure difference is generated between the airtight chambers 91 and 93, the movable member 77 can move, so that one of the two airtight chambers 91 and 93 expands and the other thereof contracts.

The control valve 104 is arranged within an engine room, on the input side of which a pipe for supplying vacuum from the engine intake manifold 106 and an opening open to atmospheric pressure are connected and on the output side of which the two passages 101 and 113 are connected. This control valve 104 is actuated by a switch arranged on an operation instrument panel or by 2-4 WD switching means (e.g. switch, lever, etc.).

The operation of the hub clutch constructed as described above will be described hereinbelow.

When the 2-4WD switching means is switched to 4WD mode, the control valve 104 is actuated so as to supply a vacuum to the airtight chamber 91 via the vacuum supply passage 113, and atmospheric pressure to the airtight chamber 93 via the vacuum supply passage 101, the gap 95, the opening 63 and the inner chamber 93. Therefore, a pressure difference is produced between the two airtight chambers 91 and 93 to contract the airtight chamber 91 and to expand the airtight chamber 93. Therefore, the movable member 77 moves the slide gear 47 in the rightward locked (4WD) position as shown in the lower half portion in FIG. 2 or FIG. 3B. , That is, since the slide gear 47 engages with the drive gear 3 to lock the hub clutch, the wheel shaft 1 is coupled to the housing 5 (i.e. The wheel). In this case, as shown in FIG. 3B, the check ball 67 engages with the recessed portion 73 of the slide gear 47 to hold the slide gear 47 at the locked position. When a sensor (See FIG. 6) detects this locked position by the check mechanism 72, the control valve 104 is actuated so that both the passages 101 and 113 are simultaneously open to atmospheric pressure; that is, the airtight chamber 91 is allowed to be open to atmospheric pressure via the pressure supply passage 111 to realize the 4WD travel under these conditions.

When the 2-4WD switching means is switched to 2WD mode, the control valve 104 is actuated so as to supply a vacuum to the airtight chamber 93 via the vacuum supply passage 101, and atmospheric pressure to the airtight chamber 91 via the vacuum supply passage 113. Therefore, a pressure difference is produced between the two airtight chambers 91 and 93 to contract the airtight chamber 93 and to expand the airtight chamber 91. Therefore, the movable member 77 moves the slide gear 47 in the leftward free (2WD) position as shown in the upper half position in FIG. 2 or FIG. 3A. That is, since the slide gear 47 disengages from the drive gear 3 to unlock the hub clutch, the wheel shaft 1 is separated free from the housing 5 (i.e. The wheel). In this case, as shown in FIG. 3A, the check ball 67 engages with the recessed portion 75 of the slide gear 47 to hold the slide gear 47 at the free position by the check mechanism 72. When the sensor (See FIG. 6) detects this free position, the control valve 104 is actuated so that both the passages 101 and 113 are simultaneously open to atmospheric pressure; that is, the airtight chamber 93 is allowed to be open to atmospheric pressure via the pressure supply passage 101 to realize the 2WD travel under these conditions.

As described above, in 2WD travel mode, the non-driven side vehicle wheel is disconnected from the power transmission system to improve the fuel consumption rate, the durability, noise, etc. On the other hand, in 4WD travel mode, the vehicle wheel is coupled to the power transmission system.

Figure 1:
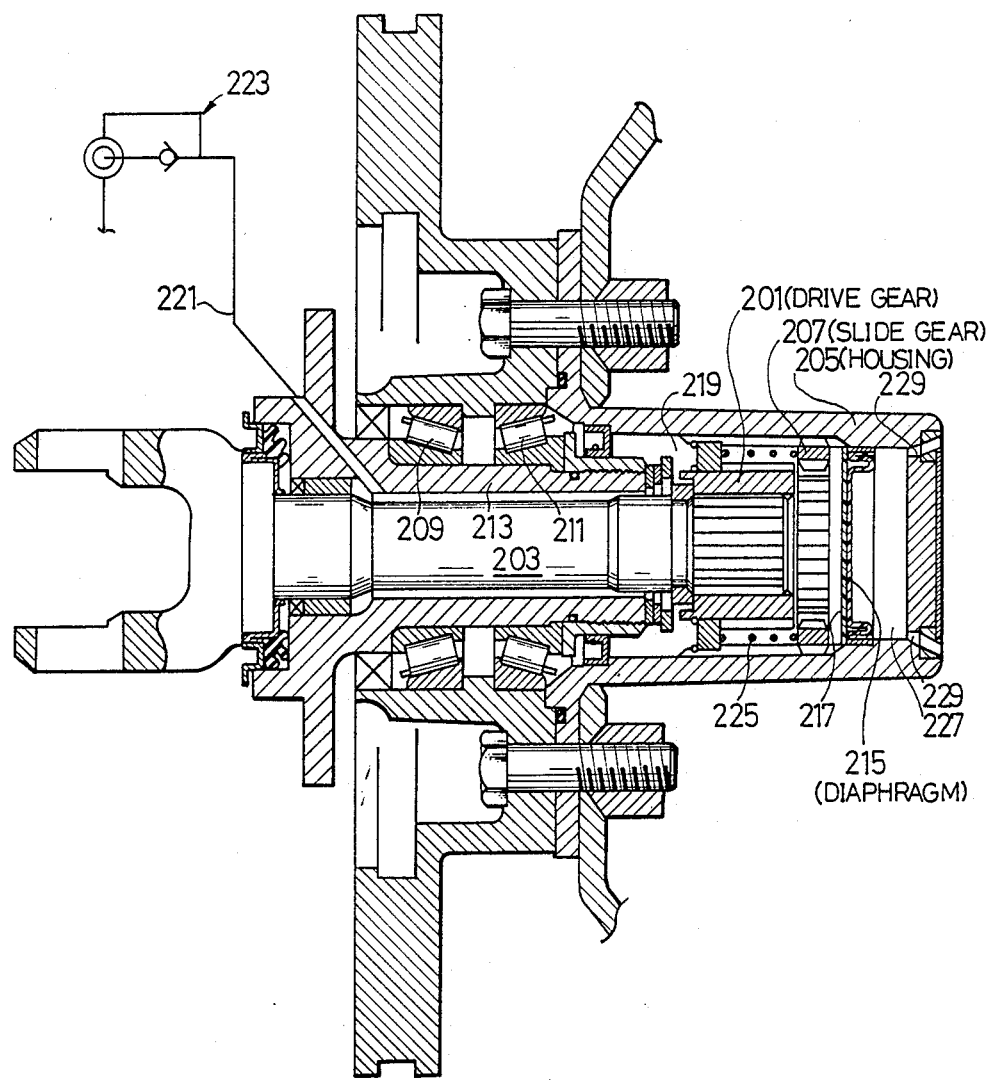
FIG. 1 is a cross-sectional view showing a prior-art hub clutch.

Further, as described above, a vacuum is applied for only several seconds to each airtight chamber in order to move the slide gear 47 from the lock condition to the free condition or vice versa. Therefore, even if the hub clutch is actuated during travel in rainy weather or along a muddy road, there exists a small chance that muddy water enters the housing 5 through the seal portions or fitted portions. Further, since each pressure is allowed to be open to atmospheric pressure within an engine room, ventilation air ports 229 as required for the prior-art hub clutch shown in FIG. 1 are unnecessary (ports 229 are required to improve response speed thereof), so that there exists no problem in that dust and muddy water enter the housing and therefore the bearings are deteriorated in function and durability due to the presence of foreign matters as frozen water, mud, etc., thus the normal function being maintained for many hours.

Further, since no vacuum pressure is applied except during hub clutch actuation and further no return spring (urging means) is used, the slide gear position will not be changed unintentionally due to change in vacuum as in the prior-art, and therefore the position of the slide gear 47 is stable owing to the presence of the check mechanism 72 as shown in FIG. 3A or 3B.

In the clutch of the present invention, the pressure supplied to the airtight chambers 91 and 93 is not limited to vacuum. That is, it is possible to apply positive pressure supplied from a pressure source. Further, it is also possible to supply a positive pressure to one (expansion side) of the two airtight chambers 91 and 93 and a vacuum pressure to the other (contraction side) thereof. Further, it is also possible to use liquid in place of air or gas as the pressure medium.

The relationship between the movable direction of the slide gear 47, and the lock and free conditions of the hub clutch can be selected freely. For instance, in the case where the gear portion 55 is formed on the right side end of the slide gear 47, when the slide gear 47 is moved in the leftward direction, the clutch is locked; on the other hand, when moved in the rightward direction, the clutch is free.

FIG. 4 and FIG. 5 show a second embodiment of a hub clutch according to the present invention. In this second embodiment, the slide gear 47 is engaged with or disengaged from the drive gear 3 by means of a piston plate 114 and a compression spring 117, instead of the diaphragm 77.

In more detail, a cylindrical piston plate 114 is pressure-fitted to an inner circumference of the slide gear 47, and further a working chamber 115 is formed between this piston plate 114 and the housing 5. Although an 0-ring 116 is disposed between the piston plate 114 and the housing 5, here, it should be noted that no air ventilation holes and sealing members are provided within the working chamber 115.

Further, it is also possible to directly move a cylindrical slide gear 47 by the spring 117, that is, to form the piston plate 114 and the slide gear 47 integrally.

The compression spring 117 is disposed within the working chamber 115 to always urge the piston plate 114 in the leftward direction at the free mode position at which the leftmost end of the slide gear 47 is brought into contact with the side surfade of a centering member 61A formed with a plurality of openings 63A arranged in circular form so as to communicate with a large space formed between the housing 5 and the spindle 21. This L-shaped centering member 61A formed with plural openings 63A is located by two retainers 57 and 59 fixed to the housing 5, but slidable relative to the drive gear 3.

A vacuum is supplied into this working chamber 115 from an intake manifold by way of a plug 123, a passage 109 formed in the spindle 21, and a passage 107 formed between the spindle 21 and the wheel hub 9, and a passage 105 formed between the wheel hub 9 and the housing 5. Further, the plug 123 is connected to a control valve to supply a vacuum into the working chamber 115. Furthermore, the control valve, the plug 123, and various passages 109, 107 and 105 constitute pressure supplying means.

The structual features and functional effects of this second embodiment other than those described above are substantially the same as with the first embodiment previously described and any detailed description of them is believed to be unnecessary. Therefore, the same reference numerals have been retained for similar elements which have the same functions as with the first embodiments.

The operation will be explained hereinbelow. When the vehicle is running on the ordinary paved road, the vehicle is driven by only the rear wheels. When the vehicle is running by the rear wheel drive, the front wheels also rotate together. To solve a problem in that the front wheel drive shaft rotates together with the front wheels, the front wheel drive shaft is decoupled from the front wheels. That is, the switching means stops supplying the intake manifold vacuum to the working chamber 115. Since no vacuum is supplied to the working chamber 115 via the plug 123, the passages 109, 107 and 105, the piston plate 114 is moved in the leftward direction in FIG. 4 by the elastic force of the compression spring 117 and simultaneously the slide gear 47 is moved or slid in the leftward direction. Therefore, the slide gear 47 is disengaged from the drive gear 3 into contact with the centering member 61A. When the slide gear 47 is disengaged from the drive gear 53, although the rotation of the front wheel is transmitted from the front wheel hub 9 and the housing 5 to the slide gear 47, but not transmitted to the drive gear 3. Therefore, it is possible not to wastefully rotate the front wheel drive shaft 1, the differential gear and the propeller shaft (both not shown).

Secondly, when the vehicle is running on a bad or rough road, the vehicle is driven in the four wheel drive mode. That is, the front wheel drive shaft 1 is coupled with the front wheels by the hub clutch in order to transmit a torque from an engine, through the front wheel drive shaft 1, to the front wheels. That is, the switching means supplies the intake manifold vacuum to the working chamber 115. This intake manifold vacuum is supplied into the working chamber 115 via the plug 123, the passages 109, 107, and 105. When a vacuum is supplied to the working chamber 115, the piston plate 114 is moved in the rightward direction in FIG. 4 against the elastic force of the compression spring 117. At this moment, the slide gear 47 in contact with the centering member 61A moves in the rightward direction into engagement with the drive gear 3 as depicted in FIG. 5. Once the slide gear 47 is engaged with the drive gear 3, the torque transmitted from the front wheel drive shaft 1 to the drive gear 3 is further transmitted to the slide gear 47 and to the front wheels via the housing 5 and the front wheel hub 9, so as to operate in four wheel drive mode.

The reason why the piston plate 114 moves in the rightward direction in FIG. 4 when a vacuum is applied into the working chamber 115, in spite of the fact that the left side space from the piston plate 114 is enclosed, is that the leftside space of the piston plate 114 communicates with a large space 115A formed between the housing 5 and the spindle 21 via the openings 63A of the centering member 61A. Therefore, when a vacuum is applied into the chamber 115, this piston plate 114 moves in the leftward direction to a position where vacuum pressure balances on both the sides of the piston plate 114, due to a big difference in volume between both the sides of the piston plate 114.

As described above, the front wheel drive shaft is coupled or decoupled with or from the front wheels by a vacuum supplied to the working chamber 115. However, since there exists no ventilation holes communicating with the external atmospheric pressure and sealing members in this working chamber 115, even if a vacuum is supplied to the working chamber 115, there exists no problem in that external dust or muddy water enters the clutch from the outside due to the presence of the vacuum within the working chamber 115. Therefore, it is possible to prevent the working chamber 115 from being clogged with dust and mud or frozen by these, thus preventing the hub clutch from being allowed to be inoperative. Further, since the pressure passages are formed independently from the wheel hubs 9 and the housing 5 and further no vacuum is supplied into the housing 5 in which the slide gear 47, the drive gear 3, etc. are housed, there exists no problems in that lubricant within the housing 5 leaks or dust and muddy water enter from the outside. In other words, it is possible to smoothly engage the slide gear 47 with the drive gear 3 or improve the durability of the hub clutch.

Further, in the above embodiment, an intake manifold vacuum is supplied into the working chamber 115 in this second embodiment, it is also possible to supply a positive pressure into the working chamber from another pressure source. In this case, the piston plate 114 is always urged in the rightward direction in FIG. 4 and moved in the leftward direction only when a positive pressure is supplied into working chamber 115, in order to engage the slide gear 47 with the drive gear 3. Further, it is also possible to construct the hub clutch in such a way that the slide gear 47 and the drive gear 3 are disengaged from each other whenever the positive or negative (vacuum) pressure is supplied into the working chamber 115.

As described above, according to the present invention, when the slide gear is moved to the engagement position, since the drive gear is engaged with the housing, the hub clutch is locked. When the slide gear is moved to the disengagement position, since the drive gear is disengaged from the housing, the hub clutch is free without being subjected to the entering of dust or muddy water from the outside to the working chamber. Therefore, it is possible to prevent the hub clutch from being allowed to be inoperative due to clogging or freezing with dust on muddy water within the working chamber. Further, since the lubricant within the housing will not leak and external dust and muddy water will not enter the clutch, it is possible to smoothly engage the slide gear with the drive gear and therefore to improve the durability of the hub clutch.

What is claimed is:

1. A hub clutch for selectively coupling or decoupling a wheel drive shaft to or from a clutch housing formed with a hub portion, comprising:
   (a) a drive gear fixed to an outer circumferential portion of the wheel drive shaft;
   (b) a slide gear axially slidably coupled to an inner circumferential portion of the clutch housing;
   (c) a movable member fixed to said slide gear so as to partition an inner space of the clutch housing into an inner enclosed chamber and an outer enclosed chamber;
   (d) means for supplying pressure into said inner and outer enclosed chambers;
   (e) a control valve, connected between the clutch housing and said pressure supplying means, for momentarily applying the pressure of said pressure supplying means into the inner chamber and atmospheric pressure into the outer chamber to engage said slide gear with said drive gear, and for applying the pressure of said pressure supplying means into the outer chamber and atmospheric pressure into the inner chamber to disengage said slide gear from said drive gear; and
   (f) a check mechanism for locating the slide gear in the respective engagement or disengagement positions, the pressure of said pressure supplying means applied into the inner and outer chambers being released and the chambers being opened to atmospheric pressure at the respective engagement or disengagement positions of said slide gear mechanism to protect the inner and outer chambers from external contaminants.

2. The hub clutch of claim 1, wherein said pressure supplying means is an engine intake manifold for supplying an intake manifold vacuum.

3. The hub clutch of claim 1, wherein said check mechanism comprises:
   (a) two recessed portions formed in the slide gear;
   (b) a check spring; and
   (c) a check ball urged by said check spring into contact with any one of said two recessed portions of the slide gear to stably locate the slide gear in the respective engagement or disengagement positions.

4. A hub clutch for selectively coupling and decoupling a wheel drive shaft to a clutch housing formed with a hub portion, comprising:
   (a) a drive gear fixed to an outer circumferential portion of the wheel drive shaft;
   (b) a slide gear coupled to an inner circumferential portion of the clutch housing, said slide gear being axially shiftable between a first position engaged with said drive gear and a second position disengaged therefrom;
   (c) a movable member extending between said slide gear and said clutch housing so as to partition an inner space of the clutch housing into inner and outer enclosed chambers;
   (d) pressure means for creating an operating pressure which is different from atmospheric pressure;
   (e) valve means communicating with said pressure means, said atmospheric pressure, and said inner and outer chambers, said valve means being adjustable between:
      (i) a first setting at which said operating pressure and atmospheric pressure are applied respectively to opposite sides of said movable member to shift said slide gear to said first position;
      (ii) a second setting at which said operating pressure and atmospheric pressure are applied respectively to opposite sides of said movable member to shift said slide gear to said second position; and
      (iii) a third setting at which atmospheric pressure is applied to both sides of said movable member; and
   (f) check means for releasably locking said slide gear at said first and second positions.

* * * * *